Figure 1:
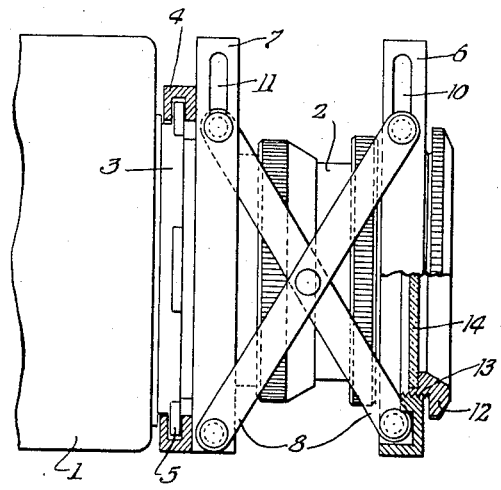

March 26, 1940.                H. SAUER ET AL                2,194,523
                         POLARIZING FILTER ATTACHMENTS
                          Filed April 19, 1937        2 Sheets-Sheet 1

Inventors:
Hans Sauer
Gerhard Henkel
Heinrich Bartels
by B. Singer
Attorney

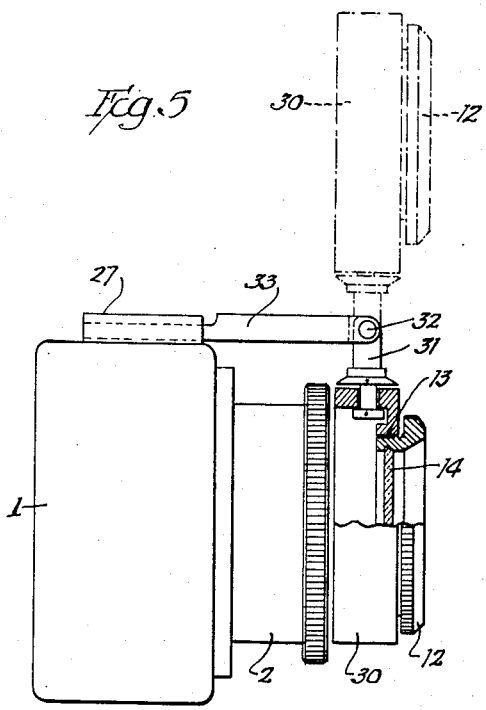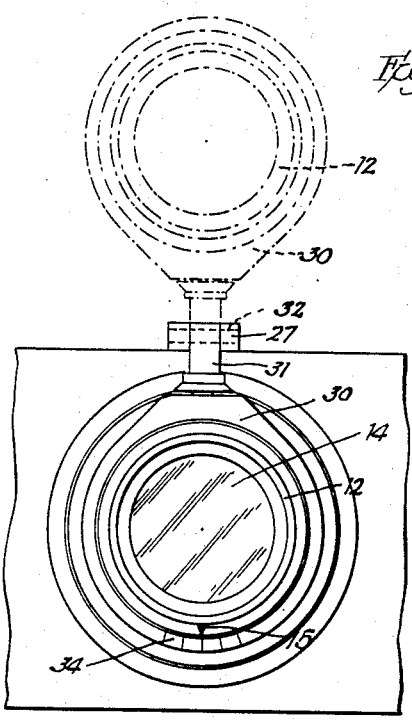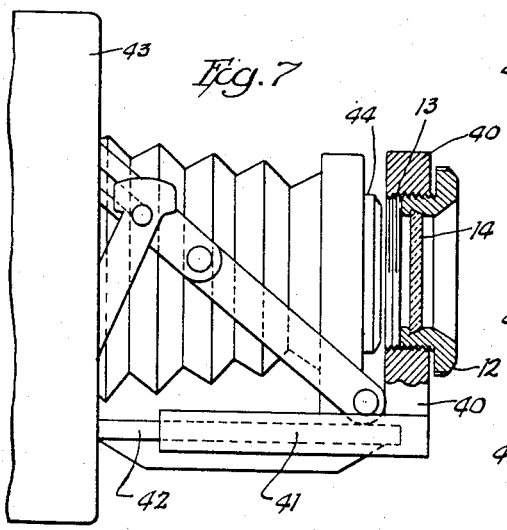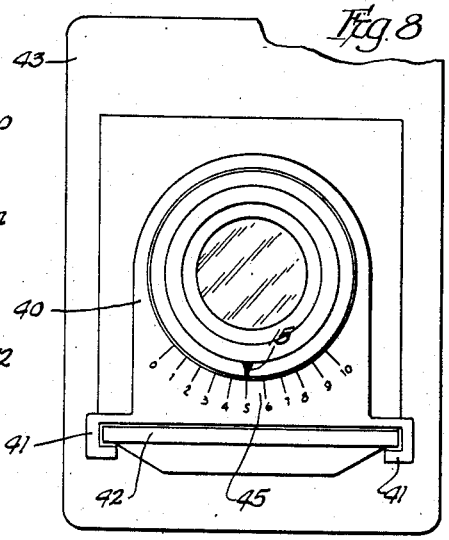

Patented Mar. 26, 1940

2,194,523

UNITED STATES PATENT OFFICE 2,194,523

POLARIZING FILTER ATTACHMENTS

Hans Sauer, Gerhard Henkel, and Heinrich Bartels, Dresden, Germany, assignors to Zeiss Ikon Aktiengesellschaft, Dresden, Germany Application April 19, 1937, Serial No. 137,844
In Germany April 18, 1936

7 Claims. (Cl. 95—64)

(Granted under the provisions of sec. 14, act of March 2, 1927; 357 O. G. 5)

The invention relates to devices for applying analyzers to photographic cameras.

The analyzers employed consist of the well known polarizing filters which are available in the form of cemented discs and foils. These polarizing filters are used for the purpose of eliminating disturbing light reflections when photographing an object or a scene and for this purpose are arranged in front of the camera lens.

The position of the polarizing filter for any picture to be taken may be a predetermined one, but it is also possible, that it is necessary to determine the position of the polarizing filter for each picture to be taken separately. This is done by observing the scene to be photographed through the filter and rotating the filter until the best result is obtained. For adjusting the filter in this way, it is necessary to remove the filter from the camera or to bring it into a position that the photographer can observe the scene through the filter.

The present invention relates in particular to polarizing filter attachments which are adapted to be attached to cameras provided with a rotatable lens system or a lens system having rotatable parts which have to be adjusted during the adjustment of the camera.

The principal object of the invention is to provide a polarizing filter attachment for cameras adapted to be attached in such a manner to the camera that the polarizing filter remains in its adjusted position when the lens system or a part of the lens system is rotated.

Another object of the invention is to provide the polarizing filter attachment with a rotatable mounting ring in which the polarizing filter is fixedly secured.

It is also an object of the invention to apply color filter to the rotatable mounting rings in which the polarizing filters are secured.

Figure 2:
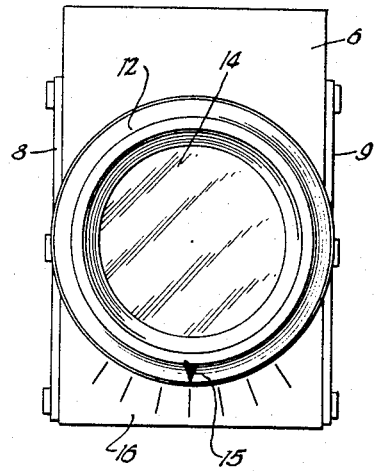
Figure 3:
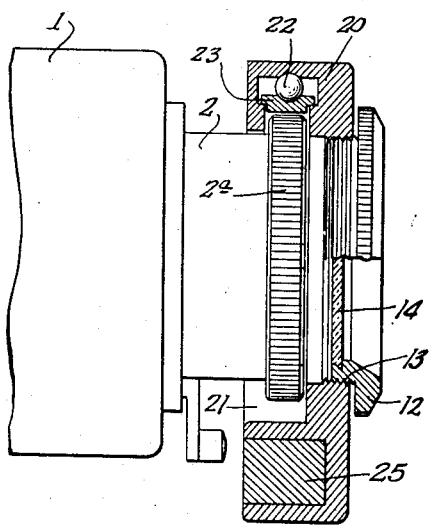
Figure 4:
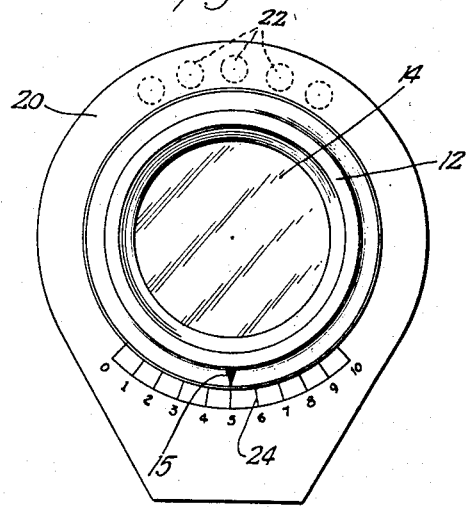

With these and other objects in view, as will appear hereinafter, the invention consists of the novel arrangements, construction of parts and combination of elements described by way of example in the following description having reference to the accompanying drawings:

In the drawings:

Fig. 1 is a side elevation view of a camera having a polarizing filter attachment of the present invention applied thereto, Fig. 2 is a front elevation view of the polarizing filter attachment illustrated in Fig. 1, Fig. 3 is a side elevation view of a camera having a modified polarizing filter attachment applied thereto, the attachment being shown in section, Fig. 4 is a front elevation view of the polarizing filter attachment as shown in Fig. 3, Fig. 5 is a side elevation view of a camera having another modified polarizing filter attachment (shown in section) applied thereto, Fig. 6 is a front elevation view of the parts shown in Fig. 5, Fig. 7 is a side elevation view of a different camera having applied thereto still another modified polarizing filter attachment, shown partially in section, and Fig. 8 is a front elevation view of the parts shown in Fig. 7.

According to Fig. 1 the camera casing 1 is provided at its front wall with a lens system 2 and also with a coupling ring 3 adapted to be connected with a cooperating coupling ring 4 on the polarizing filter attachment. Preferably the coupling rings 3 and 4 are connected with each other by a bayonet-joint indicated at 5.

The polarizing filter attachment includes a front member 6, a rear member 7 and two pairs of crossed links 8 and 9 pivotally connecting the members 6 and 7 with each other. One end of each link has a pin-slot connection with its respective member 6 and 7 as indicated at 10 and 11 respectively. The front member 6 is provided for rotatably supporting by means of a threaded connection 13 a mounting ring 12 in which a polarizing filter 14 is secured. The coupling ring 4 is attached to the rear member 7. The mounting ring 12 is provided with an index 15 opposite a scale 16 on the front member 6 so that the position of the polarizing filter 14 can be readily read or the position of the polarizing plane indicated respectively.

In the extended position of the pairs of links 8 and 9 the polarizing filter 14 is positioned a small distance in front of the lens system 2 and the latter can be rotatably adjusted without interfering with any previous adjustment of the filter 14.

If it is not desired to use the polarizing filter the entire attachment can be removed readily from the camera and then can be folded together. In the folded condition the polarizing filter attachment requires very little space and may be placed in a small box or case.

The modification of the polarizing filter attachment illustrated in the Figs. 3 and 4 is applied to and supported by the rotatably adjustable lens system 2. It comprises a casing-like member 20 provided at its rear face with a recess 21 for receiving the front portion 2ª of the lens system 2. The upper portion of the casing member 20 contains a ball bearing 22, the inner ball race 23 of which comes to rest on the front portion 2ª of the lens system 2. The mounting ring 12 with the polarizing filter 14 is rotatably mounted by means of a thread 13 in the front portion of the casing member 20. The index 15 on the mounting ring 12 cooperates with a scale 24 on the front face of member 20 and indicates the position of the polarizing filter 14. The lower portion of the casing member 20 is provided with a weight 25 which tends to maintain the polarizing filter attachment in a vertical position, even though the camera 1 may be tilted. This action is assisted by the ball bearing 22 which permits a rotative adjustment of the lens system 2 without causing thereby a corresponding rotation of the polarizing filter 14 which remains in its adjusted position.

The Figs. 5 and 6 illustrate a modified embodiment of the polarizing filter attachment which is inserted in the customary finder shoe 27 arranged on the top wall of the camera 1. The annular casing 30 in which the mounting ring 12 containing the polarizing filter 14 is rotatably mounted by means of a thread 13 is connected by a suspension bolt 31 and a ball joint 32 on one end of a horizontal bar 33 whose other end is adapted to be inserted in the finder shoe 27 as shown in Fig. 5. The casing 30 with the polarizing filter 14 thereon is adapted to be swung from the position in front of the lens system 2, as shown in solid lines in the Figs. 5 and 6, to the position indicated in dotted lines. In this last named position the photographer may observe the scene to be photographed through the filter 14 and adjust the same to a position in which the disturbing light reflections are eliminated. The index 15 on the mounting ring 12 is associated with a scale 34 on the casing 30 to indicate the adjusted position of the filter. After the adjustment of the filter 14 it is again placed in front of the lens system 2.

The transfer of the polarizing filter from the position in front of the lens system to a position for observing the scene through the filter and vice versa may be effected in various ways. The polarizing filter may be swung in the plane of the filter disc from the position in front of the lens system to the observation position and reverse. The polarizing filter may also be rotated 180° about an axis parallel to the filter plane and at the same time be rotated 90° in the filter plane, for the purpose of being moved from a position in front of the lens system to the observation position or vice versa. The filter attachment may also be constructed in such a manner, that when moving the filter from a position in front of the camera lens to an observation position and vice versa, it has to be rotated 180° about an axis parallel to the filter plane and simultaneously an axis which extends at a right angle to the first axis of rotation.

During the transfer of the polarizing filter from one of said positions to the other the various described movements may be effected one after the other or simultaneously, for instance by employing a suitable linkage for guiding the filter.

The Figs. 7 and 8 show a polarizing filter attachment particularly adapted for cameras provided with extensible bellows. This polarizing attachment consists of a vertical frame member 40 provided with horizontally extending guideways 41 adapted to be slidably attached to the runway 42 of the bellows camera 43, the lens system of which is indicated with 44. The frame member 40 supports rotatably by means of a thread 13 the mounting ring 12 containing the polarizing filter 14. It will be noted that the polarizing filter 14 comes to lie a small distance in front of the lens system 44 and that the latter may be rotatably adjusted independently of the filter 14. The outer face of the frame member 40 is provided with a scale 45 associated with the index 15 on the mounting ring 12 to indicate the position of the polarizing filter 14.

The mounting ring of the polarizing filter may be constructed in such a manner that a color filter can be attached in front of the polarizing filter. The combination of a color filter and a polarizing filter has a number of advantages. If, for instance, a polarizing filter is used which does not completely polarize the long-wave red light, then it is advisable to employ a color filter which absorbs this long-wave red light, when a light sensitive emulsion is employed which is ultra-red sensitive. Another advantage of the combination of a polarizing filter and a color filter consists in this, that a predetermined reproduction of the light values of colors may be obtained. It is, for instance, advisable to employ the combination of a polarizing filter and a blue or green color filter for panchromatic emulsion, while the combination of a polarizing filter and a yellow filter is advisable for orthochromatic emulsions.

What we claim as our invention is:

1. A polarization device for a photographic camera of that type in which the camera objective is rotatably adjusted for focusing, said polarization device comprising a frame, means on said frame for detachably attaching the same to the casing of the camera, said frame being provided with an aperture, a manually operable mounting ring rotatably adjustable in said aperture, and a polarizing foil fixedly secured in said mounting ring, said polarizing foil coming to lie in front of the camera objective and being axially spaced from the latter when the said frame is attached to the casing of the camera so as to be rotated about the axis of the camera objective when said mounting ring is rotated in said frame to vary thereby the angular position of the polarization plane of said foil, said polarizing foil remaining stationary in any adjusted position irrespective of any rotative adjustment of said camera objective.

2. A polarization device for a photographic camera of that type in which the camera objective is rotatably adjusted for focusing, said polarization device comprising a frame, means on said frame for detachably attaching the same to the casing of the camera, said frame being provided with a circular aperture, a manually operable mounting ring rotatably adjustable in said aperture, and a polarizing foil fixedly secured in said mounting ring, said polarizing foil coming to lie in front of the camera objective and being axially spaced from the latter, when the said frame is attached to the camera casing, so as to be rotated about the axis of the camera objective when said mounting ring is rotated in said frame to vary thereby the angular position of the polarization plane of said foil, said polarizing foil remaining stationary in its adjusted position irrespective of any rotative adjustment of said camera objective.

3. A polarization device for a photographic camera of that type in which the camera objective is rotatably adjusted for focusing, said polarization device comprising a frame provided with a circular aperture, a manually operable mounting ring rotatably adjustable in said aperture, a polarizing foil fixedly secured in said mounting ring, and supporting means for said frame, said supporting means having one portion, adapted to be slidably attached to a portion of the casing of the camera, said polarizing foil coming to lie axially spaced in front of the camera objective when the said supporting means is attached to the casing of the camera, so as to be rotated about the axis of the camera objective when said mounting ring is rotated in said frame to vary the angular position of the polarization plane of said foil, said polarizing foil remaining stationary in its adjusted position irrespective of any rotative adjustment of said camera objective.

4. A polarizing filter attachment for photographic cameras provided with a rotatably adjustable lens system, comprising a frame, a polarizing filter rotatably adjustably mounted in said frame, and supporting means for said frame and adapted to be attached to the camera for positioning said frame and polarizing filter therein axially spaced in front of the lens system and independently of the latter the polarizing filter remaining in its position when the lens system is rotatably adjusted, said frame being pivotally connected to said supporting means and being adapted to move the polarizing filter from the position in front of the lens system to a position in which the scene to be photographed can be observed through the filter, the angular position of the polarization plane of said filter in both said positions being the same.

5. A polarizing filter attachment for photographic cameras provided with a rotatably adjustable lens system, comprising a frame, a polarizing filter rotatably adjustably mounted in said frame, supporting means for said frame and adapted to be attached to the camera for positioning said frame and polarizing filter therein axially spaced in front of the lens system and independently of the latter the polarizing filter remaining in its position when the lens system is rotatably adjusted, and means pivotally connecting said frame to said supporting means, for moving said polarizing filter from the position in front of the lens system to a position lateral of the camera in which position the scene to be photographed can be observed through the filter, the angular position of the polarization plane of said filter in both said positions being the same.

6. A polarizing filter attachment for photographic cameras provided with a rotatably adjustable lens system, comprising a frame, a polarizing filter rotatably adjustably mounted in said frame, supporting means for said frame and adapted to be attached to the camera for positioning said frame and polarizing filter therein axially spaced in front of the lens system and independently of the latter the polarizing filter remaining in its position when the lens system is rotatably adjusted, and means for pivotally connecting said frame to said supporting means, said pivotally connecting means permitting a transfer of the polarizing filter from the position in front of the lens system to an observation position lateral of the camera and vice versa, by rotating said frame 180° about an axis extending parallel to the plane of the filter and simultaneously rotating the filter 90° in its plane.

7. A polarizing filter attachment for photographic cameras provided with a rotatably adjustable lens system, comprising a frame, a polarizing filter rotatably adjustably mounted in said frame, supporting means for said frame and adapted to be attached to the camera for positioning said frame and polarizing filter therein axially spaced in front of the lens system and independently of the latter the polarizing filter remaining in its position when the lens system is rotatably adjusted, and means for pivotally connecting said frame to said supporting means, said pivotally connecting means permitting a transfer of the polarizing filter from the position in front of the lens system to an observation position lateral of the camera and vice versa, by rotating said frame 180° about an axis extending parallel to the filter plane and simultaneously rotating the filter 180° about an axis extending parallel to said filter plane and at a right angle with respect to said first axis of rotation.

HANS SAUER.
GERHARD HENKEL.
HEINRICH BARTELS.